(12) United States Patent
Ohmori et al.

(10) Patent No.: US 10,308,750 B2
(45) Date of Patent: Jun. 4, 2019

(54) POLYMERIZABLE COMPOSITION CONTAINING REACTIVE SILSESQUIOXANE COMPOUND

(71) Applicant: NISSAN CHEMICAL INDUSTRIES, LTD., Tokyo (JP)

(72) Inventors: Kentaro Ohmori, Funabashi (JP); Takehiro Nagasawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 168 days.

(21) Appl. No.: 15/122,308

(22) PCT Filed: Feb. 26, 2015

(86) PCT No.: PCT/JP2015/055684
§ 371 (c)(1),
(2) Date: Aug. 29, 2016

(87) PCT Pub. No.: WO2015/129818
PCT Pub. Date: Sep. 3, 2015

(65) Prior Publication Data
US 2016/0369029 A1 Dec. 22, 2016

(30) Foreign Application Priority Data
Feb. 28, 2014 (JP) .................. 2014-038738

(51) Int. Cl.
| | | |
|---|---|---|
| C08F 290/06 | (2006.01) | |
| C08F 220/30 | (2006.01) | |
| C08F 230/08 | (2006.01) | |
| C08G 77/20 | (2006.01) | |
| G02B 1/04 | (2006.01) | |
| C08L 83/04 | (2006.01) | |
| C08L 83/10 | (2006.01) | |
| C08G 77/442 | (2006.01) | |

(52) U.S. Cl.
CPC ........ C08F 290/068 (2013.01); C08F 220/30 (2013.01); C08F 230/08 (2013.01); C08G 77/20 (2013.01); C08L 83/04 (2013.01); C08L 83/10 (2013.01); G02B 1/041 (2013.01); C08G 77/442 (2013.01)

(58) Field of Classification Search
CPC ...................................... C08G 77/20
See application file for complete search history.

(56) References Cited

U.S. PATENT DOCUMENTS

| | | | |
|---|---|---|---|
| 2010/0209669 A1 | 8/2010 | Aoai et al. | |
| 2011/0230584 A1* | 9/2011 | Araki ............... | C08F 290/148 522/99 |

FOREIGN PATENT DOCUMENTS

| | | |
|---|---|---|
| JP | H09-31136 A | 2/1997 |
| JP | 2005-290199 A | 10/2005 |
| JP | 2005290199 A * | 10/2005 |
| JP | 2008-297490 A | 12/2008 |
| JP | 2008297490 A * | 12/2008 |
| JP | 2011-052065 A | 3/2011 |
| JP | 2012-062398 A | 3/2012 |
| WO | 2010/061744 A1 | 6/2010 |

OTHER PUBLICATIONS

Sep. 25, 2017 Extended European Search Report issued in European Patent Application No. 15754971.8.
Apr. 28, 2015 Search Report issued in International Patent Application No. PCT/JP2015/055684.
Apr. 28, 2015 Written Opinion issued in International Patent Application No. PCT/JP2015/055684.

* cited by examiner

Primary Examiner — Kuo Liang Peng
(74) Attorney, Agent, or Firm — Oliff PLC

(57) ABSTRACT

A polymerizable composition that is suitable to produce a molded product that can suppress cracking and dimensional change caused by a high-temperature heat history with a high refractive index of a cured product maintained. A polymerizable composition including (a) 100 parts by mass of the specific reactive silsesquioxane compound, (b) 10 to 500 parts by mass of the specific fluorene compound, a cured product obtained by the polymerizable composition and a material for a high-refractive index resin lens including the polymerizable composition.

16 Claims, 1 Drawing Sheet

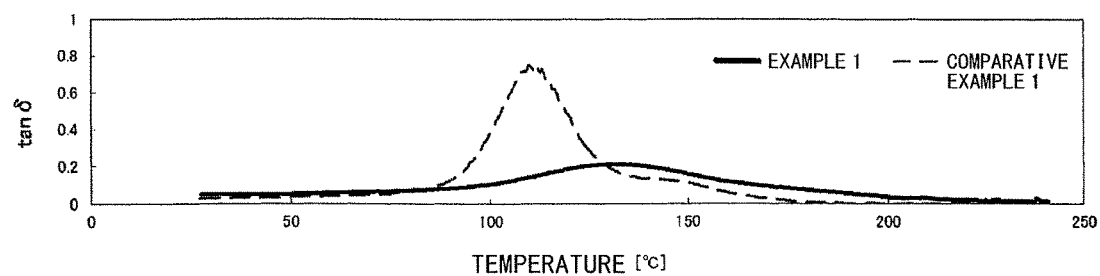

POLYMERIZABLE COMPOSITION CONTAINING REACTIVE SILSESQUIOXANE COMPOUND

TECHNICAL FIELD

The present invention relates to a polymerizable composition containing a reactive silsesquioxane compound. The present invention relates to a polymerizable composition capable of forming a cured product that has remarkably improved crack resistance and dimensional stability over temperature variation with excellent optical properties maintained.

BACKGROUND ART

A plastic lens has been used for a mobile phone, a digital camera, an in-vehicle camera, or the other appliance. The plastic lens is required to have excellent optical properties corresponding to the purpose of such an appliance. Further, the plastic lens is required to have high durability, for example, heat resistance, weather resistance, and the like, and high productivity capable of molding with good yield corresponding to a use mode. As such a resin material, for example, a transparent resin such as a polycarbonate resin, a cycloolefin polymer, and a methacryl resin has been used.

In recent years, a method for collectively mounting a camera module by solder reflow has been proposed in order to decrease the cost for mounting. As a material for the plastic lens used in the method, a material that can tolerate a high-temperature heat history (e.g., 260° C.) in a solder reflow process is required. However, since the conventional plastic lens has low heat resistance, it is difficult that the plastic lens is satisfactorily applied to the reflow process.

For a high-resolution camera module, a plurality of lenses are used. An optical material having a high refractive index is required for one wavelength correction lens among the lenses. In order to improve the yield and the production efficiency, the production of the resin lens has been changing from injection molding of a thermoplastic resin to pressing molding using a liquid curable resin at room temperature.

However, in most of conventional materials proposed as a material characterized by a high refractive index, even when the heat resistance is improved as described in Patent Document 1, the heat resistance temperature is 200° C. or lower. For example, the heat resistance that can tolerate the solder reflow process at 260° C. has not been yet secured.

On the other hand, since sufficient heat resistance of reflow is unlikely to be secured by only an organic material, a material in which inorganic fine particles such as silica are mixed in the organic material to impart heat resistance has been proposed (for example, see Patent Document 2). However, in order to satisfy the heat resistance, the content of silica needs to be increased, and as a result, there is a problem in which an increase in refractive index of a composition is hampered. Further, the coagulation of the inorganic fine particles may decrease transparency, and the addition of fine particles may develop fragility of a cured product. These show that the reliability is poor.

PRIOR ART DOCUMENTS

Patent Documents

Patent Document 1: Japanese Patent Application Publication No. H09-31136 (JP H09-31136 A)

Patent Document 2: Japanese Patent Application Publication No. 2012-62398 (JP 2012-62398 A)

SUMMARY OF THE INVENTION

Problem to be Solved by the Invention

As described above, a curable resin material that can be used as a lens for a high-resolution camera module, and satisfies optical properties (high refractive index) and heat resistance that is suitable for a mounting process including solder reflow and the like, such as crack resistance and dimensional stability over temperature variation has not been found. Therefore, the development of such a curable resin material is desired.

In view of the circumstances, an object of the present invention is to provide a polymerizable composition that is suitable to produce a molded product that can suppress cracking and dimensional change caused by a high-temperature heat history with a high refractive index of a cured product maintained.

Means for Solving the Problems

In order to solve the above-described problems, the present inventors have intensively investigated, and as a result, have found that when a specific fluorene compound is added in addition to a specific reactive silsesquioxane compound, an obtained cured product (molded product) which can suppress cracking and dimensional change caused by a high-temperature heat history with a high refractive index maintained can be obtained. Thus, the present invention has been accomplished.

Specifically, as a first aspect, the present invention relates to a polymerizable composition comprising (a) 100 parts by mass of reactive silsesquioxane compound obtained by polycondensation of an alkoxy silicon compound A of Formula [1] with an alkoxy silicon compound B of Formula [2] in the presence of an acid or a base, and (b) 10 to 500 parts by mass of fluorene compound of Formula [3].

(wherein $Ar^1$ is a phenyl group having at least one group having a polymerizable double bond or a naphthyl group having at least one group having a polymerizable double bond, and $R^1$ is a methyl group or an ethyl group.)

(wherein $Ar^2$ is a phenyl group optionally substituted by a $C_{1-6}$ alkyl group, or a naphthyl group optionally substituted by a $C_{1-6}$ alkyl group, and $R^2$ is a methyl group or an ethyl group.)

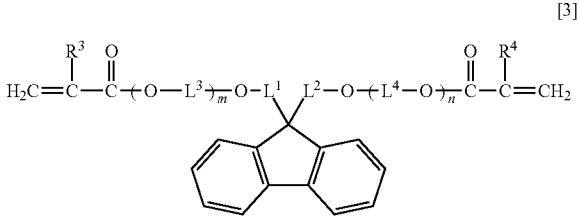

(wherein $R^3$ and $R^4$ are each independently a hydrogen atom or a methyl group, $L^1$ and $L^2$ are each independently a phenylene group optionally having a substituent, $L^3$ and $L^4$ are each independently a $C_{1-6}$ alkylene group, and m and n are 0 or a positive integer such that m+n is 0 to 40.)

As a second aspect, the present invention relates to the polymerizable composition according to the first aspect, further comprising 10 to 100 parts by mass of (c) (meth)acrylate compound that is different from the fluorene compound.

As a third aspect, the present invention relates to the polymerizable composition according to the second aspect, wherein the (c) (meth)acrylate compound is a mono(meth)acrylate compound having an aromatic group.

As a fourth aspect, the present invention relates to the polymerizable composition according to any one of the first to third aspects, wherein the (a) reactive silsesquioxane compound is a reactive silsesquioxane compound obtained by polycondensation of a compound of Formula [1a] with a compound of Formula [2a] in the presence of an acid or a base.

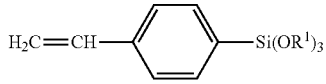  [1a]

(wherein $R^1$ has the same meaning as described above.)

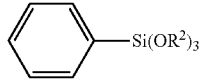  [2a]

(wherein $R^2$ has the same meaning as described above.)

As a fifth aspect, the present invention relates to the polymerizable composition according to any one of the first to fourth aspects, wherein a cured product obtained from the composition has an Abbe number of 32 or less.

As a sixth aspect, the present invention relates to a cured product obtained by polymerization of the polymerizable composition according to any one of the first to fifth aspects.

As a seventh aspect, the present invention relates to a material for a high-refractive index resin lens that includes the polymerizable composition according to any one of the first to fifth aspects.

As an eighth aspect, the present invention relates to a method for producing a molded body comprising steps of charging a space between a support and a mold with the polymerizable composition according to any one of the first to fifth aspects, exposing the charged composition to light resulting in photopolymerization, releasing a photopolymerized product on the support from the mold, and heating the photopolymerized product together with the support.

As a ninth aspect, the present invention relates to the method according to the eighth aspect, wherein the molded body is a lens for a camera module.

Effects of the Invention

A cured product of the polymerizable composition of the present invention including a specific reactive silsesquioxane compound and a specific fluorene compound has not only optical properties (high refractive index) that is desirable for an optical device, for example, a lens for a high-resolution camera module, but also high heat resistance including crack resistance and dimensional stability that are necessary for a process of mounting a camera module.

Therefore, a material for a high-refractive index resin lens of the present invention including the polymerizable composition may be suitably used as the lens for a high-resolution camera module.

According to the production method of the present invention, a molded body, and in particular, a molded body as the lens for a camera module can be suitably produced.

Further, since the polymerizable composition of the present invention has a viscosity capable of being sufficiently handled in the absence of a solvent, the polymerizable composition can be suitably molded into a molded body by applying pressing processing (imprint technique) of a mold such as a die.

BRIEF DESCRIPTION OF THE DRAWINGS

FIG. 1 is a diagram showing a change in a value of tan δ (loss elastic modulus E"/storage elastic modulus E') relative to a measurement temperature that is measured on specimens of Example 1 and Comparative Example 1.

MODES FOR CARRYING OUT THE INVENTION

<<Polymerizable Composition>>

The polymerizable composition of the present invention is a polymerizable composition containing a reactive silsesquioxane compound as a (a) component, and a fluorene compound as a (b) component. Hereinafter, each component will be described in detail.

<(a) Reactive Silsesquioxane Compound>

The (a) reactive silsesquioxane compound used in the present invention is a compound obtained by polycondensation of an alkoxy silicon compound A having a specific structure with an alkoxy silicon compound B having a specific structure described below in the presence of an acid or a base.

[Alkoxy Silicon Compound A]

The alkoxy silicon compound A is a compound of the following Formula [1].

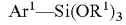  [1]

In Formula[1], $Ar^1$ is a phenyl group having at least one group having a polymerizable double bond or a naphthyl group having at least one group having a polymerizable double bond, and $R^1$ is a methyl group or an ethyl group.

Examples of the phenyl group having at least one group having a polymerizable double bond of $Ar^1$ include a 2-vinylphenyl group, a 3-vinylphenyl group, a 4-vinylphenyl group, a 4-vinyloxyphenyl group, a 4-allylphenyl group, a 4-allyloxyphenyl group, a 4-isopropenylphenyl group, and the like.

Examples of the naphthyl group having at least one group having a polymerizable double bond of $Ar^1$ include a 4-vinylnaphthalen-1-yl group, a 6-vinylnaphthalen-2-yl group, and the like.

Specific examples of the compound of Formula [1] include, but not limited to, trimethoxy(4-vinylphenyl)silane, triethoxy(4-vinylphenyl)silane, trimethoxy(4-isopropenylphenyl)silane, trimethoxy(4-vinyl-1-naphthyl)silane, and the like.

[Alkoxy Silicon Compound B]

The alkoxy silicon compound B is a compound of the following Formula [2].

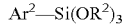  [2]

In Formula [2], $Ar^2$ is a phenyl group optionally substituted by a $C_{1-6}$ alkyl group, or a naphthyl group optionally substituted by a $C_{1-6}$ alkyl group, and $R^2$ is a methyl group or an ethyl group.

Examples of the phenyl group optionally substituted by a $C_{1-6}$ alkyl group of $Ar^2$ include a phenyl group, a o-tolyl group, a m-tolyl group, a p-tolyl group, a 2,4,6-trimethylphenyl group, and a 4-tert-butylphenyl group.

Examples of the naphthyl group optionally substituted by a $C_{1-6}$ alkyl group of $Ar^2$ include a 1-naphthyl group, a 2-naphthyl group, a 4-methylnaphthalen-1-yl group, a 6-methylnaphthalen-2-yl group, and the like.

Specific examples of the compound of Formula [2] include, but not limited to, trimethoxy(phenyl)silane, triethoxy(phenyl)silane, trimethoxy(p-tolyl)silane, trimethoxy(naphthyl)silane, triethoxy(naphthyl)silane, and the like.

It is preferable that the reactive silsesquioxane compound as the (a) component be a reactive silsesquioxane compound obtained by polycondensation of a compound of the following Formula [1a] with a compound of the following Formula [2a] in the presence of an acid or a base.

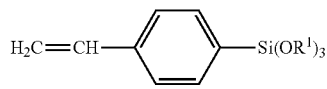

[1a]

In Formula [1a], $R^1$ has the same meaning as described above.

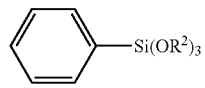

[2a]

In Formula [2a], $R^2$ has the same meaning as described above.

[Mixing Ratio of Alkoxy Silicon Compound A and Alkoxy Silicon Compound B]

A mixing molar ratio in a polycondensation reaction of the alkoxy silicon compound A of Formula [1] with the alkoxy silicone compound B of Formula [2] that are used for the reactive silsesquioxane compound as the (a) component is not particularly limited. In order to stabilize physical properties of a cured product, it is preferable that the mixing molar ratio of the alkoxy silicon compound A to the alkoxy silicon compound B generally falls within a range of 5:1 to 1:5, and more preferably 3:1 to 1:3. When the ratio of the mixing molar amount of the alkoxy silicon compound A to that of the alkoxy silicon compound B is 5 or less, an unreacted polymerizable double bond remained in the cured product is reduced, and a more firmly cured product can be obtained. When the ratio of the mixing molar amount of the alkoxy silicon compound A to that of the alkoxy silicon compound B is ⅕ or more, a sufficient crosslink density is obtained, and the dimensional stability over heat is further improved.

As the alkoxy silicon compounds A and B, a compound can be appropriately selected if necessary, and used, and each thereof, a plurality of compounds may be used in combination. Concerning also the mixing molar ratio in this case, the ratio of total molar amount of the alkoxy silicon compound A to that of the alkoxy silicon compound B falls within the aforementioned range.

[Acid or Basic Catalyst]

The polycondensation reaction of the alkoxy silicon compound A of Formula [1] with the alkoxy silicon compound B of Formula [2] is suitably performed in the presence of an acid or basic catalyst.

The catalyst used in the polycondensation reaction is not particularly limited as long as it is dissolved in a solvent described below or uniformly dispersed. The catalyst may be appropriately selected if necessary, and used.

Examples of usable catalyst include acidic compounds including inorganic acids such as hydrochloric acid, nitric acid, and sulfuric acid, organic acids such as acetic acid and oxalic acid, $B(OR)_3$, $Al(OR)_3$, $Ti(OR)_4$, $Zr(OR)_4$, and the like; basic compounds including alkali metal hydroxides, alkaline earth metal hydroxides, ammonium hydroxide, quaternary ammonium salts, amines, and the like; and fluoride salts such as $NH_4F$ and $NR_4F$. Herein, R is at least one selected from the group consisting of a hydrogen atom, a $C_{1-12}$ linear alkyl group, a $C_{3-12}$ branched alkyl group and a $C_{3-12}$ cyclic alkyl group.

These catalysts may be used singly or in combination of two or more of them.

Examples of the acidic compounds include hydrochloric acid, nitric acid, sulfuric acid, acetic acid, oxalic acid, boric acid, trimethoxyboron, triethoxyboron, tri-n-propoxyboron, triisopropoxyboron, tri-n-butoxyboron, triisobutoxyboron, tri-sec-butoxyboron, tri-tert-butoxyboron, trimethoxyaluminum, triethoxyaluminum, tri-n-propoxyaluminum, triisopropoxyaluminum, tri-n-butoxyaluminum, triisobutoxyaluminum, tri-sec-butoxyaluminum, tri-tert-butoxyaluminum, tetramethoxytitanium, tetraethoxytitanium, tetra-n-propoxytitanium, tetraisopropoxytitanium, tetra-n-butoxytitanium, tetraisobutoxytitanium, tetra-sec-butoxytitanium, tetra-tert-butoxytitanium, tetramethoxyzirconium, tetraethoxyzirconium, tetra-n-propoxyzirconium, tetraisopropoxyzirconium, tetra-n-butoxyzirconium, tetraisobutoxyzirconium, tetra-sec-butoxyzirconium, tetra-tert-butoxyzirconium, and the like.

Examples of the basic compounds include sodium hydroxide, potassium hydroxide, magnesium hydroxide, calcium hydroxide, strontium hydroxide, barium hydroxide, ammonium hydroxide, tetramethylammonium hydroxide, tetrabutylammonium hydroxide, triethylamine, and the like.

Examples of the fluoride salts include ammonium fluoride, tetramethylammonium fluoride, tetrabutylammonium fluoride, and the like.

Among the catalysts, one or more selected from the group consisting of hydrochloric acid, acetic acid, potassium hydroxide, calcium hydroxide, and barium hydroxide are preferably used.

The amount of the catalyst to be used is 0.01 to 10% by mass, and preferably 0.1 to 5% by mass, relative to the total amount of the alkoxy silicon compounds A and B. When the amount of the catalyst to be used is 0.01% by mass or more, the reaction more favorably proceeds. In consideration of economy, a use amount of 10% by mass or less is sufficient.

[Polycondensation Reaction]

The reactive silsesquioxane compound according to the present invention has a characteristic of structure of the alkoxy silicon compound A. A reactive group (polymerizable double bond) in the alkoxy silicon compound A used in the present invention is easily polymerized by radicals or cations, and exhibits high heat resistance after polymerization (after curing).

A hydrolysis polycondensation reaction of the alkoxy silicon compound A with the alkoxy silicon compound B can be performed in the absence of a solvent. Further, as a reaction solvent, a solvent inert to both the alkoxy silicon compounds such as toluene described below can be used. Use of the reaction solvent is likely to make a reaction system homogeneous, and has an advantage in which the polycondensation reaction is more stably performed.

A synthesis reaction of the reactive silsesquioxane compound may be performed in the absence of a solvent, as described above. However, in order to make the reaction more homogeneous, the solvent may be used without any problem. The solvent is not particularly limited as long as it is not reacted with both the alkoxy silicon compounds and allows a polycondensate to be dissolved.

Examples of such a reaction solvent include ketones such as acetone, and methyl ethyl ketone (MEK); aromatic hydrocarbons such as benzene, toluene, and xylene; glycols such as ethylene glycol, propylene glycol, and hexylene glycol; glycol ethers such as ethyl cellosolve, butyl cellosolve, ethyl carbitol, butyl carbitol, diethyl cellosolve, and diethyl carbitol; and amides such as N-methyl-2-pyrrolidone (NMP) and N,N-dimethyl formamide (DMF). These solvents may be used singly or as a mixture of two or more of them.

The reactive silsesquioxane compound used in the present invention is obtained by hydrolysis polycondensation of the alkoxy silicon compound A of Formula [1] with the alkoxy silicon compound B of Formula [2] in the presence of an acid or basic catalyst. The reaction temperature in the hydrolysis polycondensation is 20 to 150° C., and preferably 30 to 120° C.

The reaction time is not particularly limited as long as it is equal to or more than a time that is required to terminate an increase in molecular weight of the polycondensate and to stabilize the molecular weight distribution. More specifically, the reaction time is from several hours to several days.

After completion of the polycondensation reaction, it is preferable that the obtained reactive silsesquioxane compound be collected by any procedure such as filtration and solvent distillation, and if necessary, appropriately purified.

The weight average molecular weight Mw of the polycondensated compound obtained by such a reaction that is measured by GPC in terms of polystyrene is 500 to 100,000, and preferably 500 to 30,000. The degree of distribution: Mw (weight average molecular weight)/Mn (number average molecular weight) is 1.0 to 10.

<(b) Fluorene Compound>

The (b) fluorene compound used in the present invention is a compound of Formula [3].

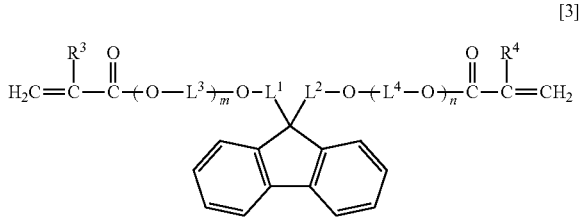

[3]

In Formula [3], $R^3$ and $R^4$ are each independently a hydrogen atom or a methyl group, $L^1$ and $L^2$ are each independently a phenylene group optionally having a substituent, $L^3$ and $L^4$ are each independently a $C_{1-6}$ alkylene group, and m and n are 0 or a positive integer such that m+n is 0 to 40.

Examples of the phenylene group optionally having a substituent of $L^1$ and $L^2$ include a o-phenylene group, a m-phenylene group, a p-phenylene group, a 2-methylbenzene-1,4-diyl group, a 2-aminobenzene-1,4-diyl group, a 2,4-dibromobenzene-1,3-diyl group, a 2,6-dibromobenzene-1,4-diyl group, and the like.

Examples of the $C_{1-6}$ alkylene group of $L^3$ and $L^4$ include a methylene group, an ethylene group, a propylene group (trimethylene group), an isopropylene group (1-methylethylene group), a butylene group (tetramethylene group), a sec-butylene group (1-methyltrimethylene group), a tert-butylene group (1,1-dimethylethylene group), a pentylene group (pentamethylene group), a neopentylene group (2,2-dimethyltrimethylene group), a tert-pentylene group (1,1-dimethyltrimethylene group), a 1-methylbutylene group (1-methyltetramethylene group), a 2-methylbutylene group (2-methyltetramethylene group), a 1,2-dimethylpropylene group (1,2-dimethyltrimethylene group), a 1-ethylpropylene group (1-ethyltrimethylene group), a hexylene group (hexamethylene group), a 1-methylpentylene group (1-methylpentamethylene group), a 2-methylpentylene group (2-methylpentamethylene group), a 3-methylpentylene group (3-methylpentamethylene group), a 1,1-dimethylbutylene group (1,1-dimethyltetramethylene group), a 1,2-dimethylbutylene group (1,2-dimethyltetramethylene group), a 2,2-dimethylbutylene group (2,2-dimethyltetramethylene group), a 1-ethylbutylene group (1-ethyltetramethylene group), a 1,1,2-trimethylpropylene group (1,1,2-trimethyltrimethylene group), a 1,2,2-trimethylpropylene group (1,2,2-trimethyltrimethylene group), a 1-ethyl-2-methylpropylene group (1-ethyl-2-methyltrimethylene group), a 1-ethyl-1-methylpropylene group (1-ethyl-1-methyltrimethylene group), and the like.

In the compound of Formula [3], it is preferable that m and n satisfy that m+n is 0 to 30, and it is more preferable that m and n satisfy that m+n is 2 to 20.

Specific examples of the compound of Formula [3] include, but not limited to, 9,9-bis(4-(2-(meth)acryloyloxyethoxy)phenyl)-9H-fluorene, OGSOL (registered trademark) EA-0200, OGSOL EA-F5003, OGSOL EA-F5503, and OGSOL EA-F5510 [all available from Osaka Gas Chemicals Co., Ltd.], NK ester A-BPEF [available from Shin Nakamura Chemical Co., Ltd.], and the like.

In the polymerizable composition of the present invention, the content of the (b) component is 10 to 500 parts by mass, and preferably 30 to 250 parts by mass, relative to 100 parts by mass of the (a) component.

<(c) (Meth)Acrylate Compound Different from the Fluorene Compound>

The polymerizable composition of the present invention may further contain a (meth)acrylate compound different from the (b) fluorene compound as a (c) component. In particular, a mono(meth)acrylate compound having an aromatic group is preferred.

In the present invention, the (meth)acrylate compound refers to both acrylate and methacrylate compounds. For example, (meth)acrylic acid refers to acrylic acid and methacrylic acid.

Examples of the mono(meth)acrylate compound having an aromatic group include, but not limited to, benzyl (meth)acrylate, 2-phenoxyethyl (meth)acrylate, phenoxydiethylene glycol (meth)acrylate, phenoxypolyethylene glycol (meth)acrylate, 2-hydroxy-3-phenoxypropyl (meth)acrylate, neopentyl glycol benzoate (meth)acrylate, ethoxylated biphenyl (meth)acrylate, and the like.

In the polymerizable composition of the present invention, the content of the (c) component is 10 to 100 parts by mass relative to 100 parts by mass of the (a) component.

<(d) Polymerization Initiator>

The polymerizable composition of the present invention may contain a (d) polymerization initiator, in addition to the (a) component and the (b) component or the (a) component to the (c) component. As the polymerization initiator, any of a photopolymerization initiator and a thermal polymerization initiator can be used.

Examples of the photopolymerization initiator include alkylphenones, benzophenones, acylphosphine oxides, Michler's benzoylbenzoates, oxime esters, tetramethylthiuram monosulfides, thioxanthones, and the like.

In particular, a photocleavage-type photoradical polymerization initiator is preferred. Examples of the photocleavage-type photoradical polymerization initiator include those described in Saishin UV Koka Gijutsu (Latest UV Curing Technology) (p. 159, issuer: Kazuhiro Takausu, published by TECHNICAL INFORMATION INSTITUTE CO., LTD, 1991).

Examples of commercially available photo-radical polymerization initiator include IRGACURE (registered trademark) 184, IRGACURE 369, IRGACURE 651, IRGACURE 500, IRGACURE 819, IRGACURE 907, IRGACURE 784, IRGACURE 2959, IRGACURE CGI1700, IRGACURE CGI1750, IRGACURE CGI1850, IRGACURE CG24-61, and IRGACURE TPO, and Darocur (registered trademark) 1116 and Darocur 1173 [all available from BASF Japan Ltd.], and ESACURE KIP150, ESACURE KIP65LT, ESACURE KIP100F, ESACURE KT37, ESACURE KT55, ESACURE KTO46, and ESACURE KIP75 [all available from Lamberti].

Examples of the thermal polymerization initiator include azos, organic peroxides, and the like.

Examples of commercially available azo-based thermal polymerization initiator include V-30, V-40, V-59, V-60, V-65, V-70 [all available from Wako Pure Chemical Industries, Ltd.], and the like.

Examples of commercially available organic peroxide-based thermal polymerization initiator include, but not limited to, Perkadox (registered trademark) CH, Perkadox BC-FF, Perkadox 14, and Perkadox 16, Trigonox (registered trademark) 22, Trigonox 23, and Trigonox 121, Kayaester (registered trademark) P and Kayaester O, Kayabutyl (registered trademark) B [all available from Kayaku Akzo Corporation], and the like.

When the polymerization initiator is added, the polymerization initiator may be used singly or as a mixture of two or more of them. The amount of the polymerization initiator to be added is 0.1 to 20 parts by mass, and more preferably 0.3 to 10 parts by mass, relative to a total amount of the polymerizable components, that is, the (a) component and the (b) component or the (a) component to the (c) component of 100 parts by mass.

A preferable aspect in the present invention is a polymerizable composition in which the Abbe number of the cured product obtained is 32 or less since the cured product obtained from the polymerizable composition has a high refractive index.

<Other Additives>

The polymerizable composition of the present invention can further contain a chain transfer agent, an antioxidant, an ultraviolet absorber, a photostabilizer, a leveling agent, a rheology controlling agent, an adhesion adjuvant such as a silane coupling agent, a pigment, a dye, an antifoam agent, or the like, if necessary, as long as the effects of the present invention are not impaired.

Examples of the chain transfer agent include thiol compounds including mercaptocarboxylic acid esters such as methyl mercaptoacetate, methyl 3-mercaptopropionate, 2-ethylhexyl 3-mercaptopropionate, 3-methoxybutyl 3-mercaptopropionate, n-octyl 3-mercaptopropionate, stearyl 3-mercaptopropionate, 1,4-bis(3-mercaptopropionyloxy)butane, 1,4-bis(3-mercaptobutyryloxy)butane, trimethylolethane tris(3-mercaptopropionate), trimethylolethane tris(3-mercaptobutyrate), trimethylolpropane tris(3-mercaptopropionate), trimethylolpropane tris(3-mercaptobutyrate), pentaerythritol tetrakis(3-mercaptopropionate), pentaerythritol tetrakis(3-mercaptobutyrate), dipentaerythritol hexakis(3-mercaptopropionate), dipentaerythritol hexakis(3-mercaptobutyrate), tris[2-(3-mercaptopropionyloxy)ethyl] isocyanurate, and tris[2-(3-mercaptobutyryloxy)ethyl] isocyanurate; alkylthiols such as ethanethiol, 2-methylpropane-2-thiol, n-dodecanethiol, 2,3,3,4,4,5-hexamethylhexane-2-thiol (tert-dodecanethiol), ethane-1,2-dithiol, propane-1,3-dithiol, and benzylthiol; aromatic thiols such as benzenethiol, 3-methyl-benzenethiol, 4-methyl-benzenethiol, naphthalene-2-thiol, pyridine-2-thiol, benzoimidazole-2-thiol, and benzothiazole-2-thiol; mercaptoalcohols such as 2-mercaptoethanol, and 4-mercapto-1-butanol; silane-containing thiols such as 3-(trimethoxysilyl)propane-1-thiol, and 3-(triethoxysilyl)propane-1-thiol, and the like; disulfide compounds including alkyl disulfides such as diethyl disulfide, dipropyl disulfide, diisopropyl disulfide, dibutyl disulfide, di-tert-butyl disulfide, dipentyl disulfide, diisopentyl disulfide, dihexyl disulfide, dicyclohexyl disulfide, didecyl disulfide, bis(2,3,3,4,4,5-hexamethylhexan-2-yl)disulfide(di-tert-dodecyl disulfide), bis(2,2-diethoxyethyl)disulfide, bis(2-hydroxyethyl)disulfide, and dibenzyl disulfide; aromatic disulfides such as diphenyl disulfide, di-p-tolyl disulfide, di(pyridin-2-yl)pyridyl disulfide, di(benzimidazol-2-yl) disulfide, and di(benzothiazol-2-yl) disulfide; and thiuram disulfides such as tetramethylthiuram disulfide, tetraethylthiuram disulfide, tetrabutylthiuram disulfide, and bis(pentamethylene)thiuram disulfide; α-methylstyrene dimer, and the like.

When the chain transfer agent is added, the chain transfer agent may be used singly or as a mixture of two or more of them. The amount of the chain transfer agent to be added is 0.01 to 20 parts by mass, and more preferably 0.1 to 10 parts by mass, relative to a total amount of the polymerizable components, that is, the (a) component and the (b) component or the (a) component to the (c) component of 100 parts by mass.

Examples of the antioxidant include a phenol-based antioxidant, a phosphoric acid-based antioxidant, a sulfide-based antioxidant, and the like. Among these, a phenol-based antioxidant is preferred.

Examples of the phenol-based antioxidant include IRGANOX (registered trademark) 245, IRGANOX 1010, IRGANOX 1035, IRGANOX 1076, and IRGANOX 1135 [all available from BASF Japan Ltd.], SUMILIZER (registered trademark) GA-80, SUMILIZER GP, SUMILIZER MDP-S, SUMILIZER BBM-S, and SUMILIZER WX-R [all available from Sumitomo Chemical Co., Ltd.], and ADK STAB (registered trademark) AO-20, ADK STAB AO-30, ADK STAB AO-40, ADK STAB AO-50, ADK STAB AO-60, ADK STAB AO-80, ADK STAB AO-330 [all available from ADEKA Corporation], and the like.

When the antioxidant is added, the antioxidant may be used singly or as a mixture of two or more of them. The amount of the antioxidant to be added is 0.01 to 20 parts by mass, and more preferably 0.1 to 10 parts by mass, relative to a total amount of the polymerizable components, that is, the (a) component and the (b) component or the (a) component to the (c) component of 100 parts by mass.

<Method for Preparing Polymerizable Composition>

A method for preparing the polymerizable composition of the embodiment is not particularly limited. Examples of the method include a method of mixing the (a) component, the (b) component, and if necessary, the (c) component, and the (d) component at a predetermined ratio, and, if desired, further adding other additives, followed by mixing to prepare a uniform solution, or a method using a common solvent in addition to these components.

When a solvent is used, the ratio of solid content in the polymerizable composition is not particularly limited as long as each component is uniformly dissolved in the solvent. For example, the ratio is 1 to 50% by mass, 1 to 30% by mass, or 1 to 25% by mass. Here, the solid content is a content of all the components of the polymerizable composition except for a solvent component.

It is preferable that a solution of the polymerizable composition be used after filtration through a filter having a pore size of 0.1 to 5 μm.

<<Cured Product>>

The polymerizable composition of the present invention is exposed to light (cured by light) or heated (thermally cured) to react a polymerizable double bond of the (a) component: reactive silsesquioxane compound with a (meth)acryloyl group of the (b) component: fluorene compound. When the (c) component is further contained, the (meth)acryloyl group of the (c) component is also reacted. Thus, a cured product may be obtained.

Examples of exposure light beam include ultraviolet light, electron beam, X ray, and the like. As a light source used in irradiation with ultraviolet light, sunbeam, a chemical lamp, a low-pressure mercury lamp, a high-pressure mercury lamp, a metal halide lamp, a xenon lamp, UV-LED, and the like can be used. After exposure to light, post-baking may be performed to stabilize the physical properties of the cured product. A method for post-baking is not particularly limited. The method is generally performed using a hot plate, an oven, and the like at 50 to 260° C. for 1 to 120 minutes.

A heating condition in thermal curing is not particularly limited, and in general, is appropriately selected from ranges of 50 to 300° C. and 1 to 120 minutes. A heating means is not particularly limited, and examples thereof include a hot plate, an oven, and the like.

The cured product obtained by curing the polymerizable composition of the present invention has a high refractive index of 1.55 or more at a wavelength of 589 nm, suppresses occurrence of cracking due to heating, and has dimensional stability. Therefore, the cured product can be suitably used as a material for a high-refractive index resin lens.

<<Molded Body>>

For example, when a common molding method such as compression molding (imprinting, etc.), casting, injection molding, and blow molding is used for the resin composition of the present invention, various molded bodies can be easily produced concurrently with formation of the cured product. The resultant molded body is also a subject of the present invention.

It is preferable that the method for producing the molded body be a method including steps of charging a space between a support and a mold with the resin composition, exposing the charged composition to light resulting in photopolymerization, releasing a photopolymerized product on the support from the mold, and heating the photopolymerized product together with the support.

The step of photopolymerization by exposure can be performed under a condition shown in <<Cured Product>> described above.

A condition in the heating step is not particularly limited, and in general, is appropriately selected from ranges of 50 to 260° C. and 1 to 120 minutes. A heating means is not particularly limited, and examples thereof include a hot plate, an oven, and the like.

The molded body produced by such a method can be suitably used as a module lens for a camera.

INDUSTRIAL APPLICABILITY

The cured product of the polymerizable composition of the present invention has a high refractive index. For the cured product obtained from the polymerizable composition of the present invention, the absence of a clear glass transition point at a temperature region of room temperature (25° C.) to 250° C. is confirmed, that is, a clear peak of a ratio tan δ of the loss elastic modulus E" to the storage elastic modulus E' (loss elastic modulus E"/storage elastic modulus E') that are obtained in measurement of dynamic viscoelasticity is not observed, and a very small maximum of tan δ is confirmed. Due to these properties, the cured product of the present invention has excellent heat resistance that suppresses occurrence of cracking and dimensional change in a high-temperature process, for example, even at a high-temperature heat history of a reflow process at 260° C. Therefore, the cured product of the present invention can be suitably used as a material for a module lens for a camera, and the like. The cured product has, of course, transparency and hardness (strength) that are usually required for the material for a module lens for a camera.

EXAMPLES

Hereinafter, the present invention will be described more specifically with reference to Examples, but the present invention is not limited to the following Examples.

In Examples, apparatuses and conditions used for preparation of samples and analysis of physical properties are as follows.

(1) Gel Permeation Chromatography (GPC)

Production Examples 1 to 3

Apparatus: HLC-8320GPC manufactured by TOSOH CORPORATION
Column: Shodex (registered trademark) GPC KF-802.5 and GPC KF-803 available from Showa Denko K.K.
Column temperature: 40° C.
Solvent: tetrahydrofuran
Detector: UV (254 nm)
Calibration curve: standard polystyrene Production Example 4

Apparatus: Prominence (registered trademark) GPC system manufactured by Shimadzu Corporation
Column: Shodex (registered trademark) GPC KF-804L and GPC KF-803L available from Showa Denko K.K.
Column temperature: 40° C.
Solvent: tetrahydrofuran
Detector: RI
Calibration curve: standard polystyrene (2) Stirring and Defoaming Apparatus
Apparatus: planetary centrifugal mixer Awatori Rentaro (registered trademark) ARE-310 manufactured by THINKY CORPORATION (3) Exposure to UV
Apparatus: batch process UV irradiation apparatus (high-pressure mercury lamp 2 kW×1 lamp) manufactured by EYE GRAPHICS CO., LTD.

(4) Refractive index $n_D$ and Abbe number $v_D$
Apparatus: multiwavelength Abbe refractometer DR-M4 manufactured by ATAGO CO., LTD.
Measurement temperature: 20° C.

(5) Glass Transition Temperature Tg
Apparatus: dynamic viscoelasticity measuring apparatus (DMA) Q800 manufactured by TA Instruments
Deformation mode: tension
Frequency: 1 Hz
Strain: 0.1%
Sweeping temperature: 25 to 250° C.
Temperature increasing rate: 10° C./min (6) Nanoimprinter
Apparatus: NM-0801HB manufactured by Meisyo Kiko Co., Ltd.

Example 6 and Comparative Examples 3 and 4

Pressing pressure: 20 N
UV exposure dose: 40 mW/cm$^2$, 80 seconds

Examples 12 to 16 and Comparative Example 5

Pressing pressure: 150 N
UV exposure dose: 20 mW/cm$^2$, 150 seconds (7) Reflow Oven
Apparatus: table-top batch reflow oven STR-3100 manufactured by SHINAPEX CO., LTD.

(8) Lens Height

Example 6 and Comparative Examples 3 and 4

Apparatus: stylus surface profilometer Dektak150 manufactured by Veeco Instruments Inc.

Examples 12 to 16 and Comparative Example 5

Apparatus: Contactless surface texture measuring instrument PF-60 manufactured by Mitaka Kohki Co., Ltd.

(9) Microscope
Apparatus: Digital microscope KH-7700 manufactured by HIROX Co., Ltd.

(10) Volatile Content
Apparatus: Halogen moisture analyzer HR83 manufactured by Mettler Toledo Abbreviations represent the following meaning.
BnA: benzyl acrylate [Viscoat#160 available from Osaka Organic Chemical Industry Ltd.]
FDA: bisarylfluorene diacrylate [OGSOL (registered trademark) EA-F5503 available from Osaka Gas Chemicals Co., Ltd.]
PTMS: trimethoxy(phenyl)silane [available from Shin-Etsu Chemical Co., Ltd.]
STMS: trimethoxy(4-vinylphenyl)silane [available from Shin-Etsu Chemical Co., Ltd.]
I184: 1-hydroxycyclohexyl phenyl ketone [IRGACURE (registered trademark) 184 available from BASF Japan Ltd.]
TPO: diphenyl(2,4,6-trimethylbenzoyl)phosphine oxide [IRGACURE (registered trademark) TPO available from BASF Japan Ltd.]
I1010: pentaerythritol tetrakis[3-(3,5-di-tert-butyl-4-hydroxyphenyl)propionate] [IRGANOX (registered trademark) 1010 available from BASF Japan Ltd.]
DDT: n-dodecanethiol [THIOKALCOL 20 available from Kao Corporation]
DDDS: didecyl disulfide [available from Tokyo Chemical Industry Co., Ltd.]

[Production Example 1] Production of Reactive Silsesquioxane Compound 1 (SQ55)

33.6 g (150 mmol) of STMS, 29.7 g (150 mmol) of PTMS, and 127 g of toluene were placed into a 300-mL reaction flask equipped with a condenser, and an air in the flask was purged with nitrogen using a nitrogen balloon. The reaction mixture was cooled to 0° C., 32.6 g of 0.55% by mass acetic acid aqueous solution (3 mmol as acetic acid) was added dropwise, and the mixture was stirred for 2 hours. Subsequently, 0.84 g (15 mmol) of potassium hydroxide was added to this reaction mixture, and the mixture was stirred at 80° C. for 6 hours.

The reaction mixture was cooled to room temperature (about 25° C.), 100 g of toluene was added, and the mixture was washed with 2% by mass sodium sulfate aqueous solution using a separation funnel until the aqueous phase became neutral to basic. The obtained organic phase was evaporated to dryness using a rotary evaporator. The residue was dissolved in 57 g of tetrahydrofuran and the solution was added dropwise to 1,300 g of n-hexane, resulting in reprecipitation. The precipitated solid was filtered through a membrane filter with a pore size of 0.2 μm, and dried to obtain a reactive silsesquioxane compound 1 (hereinafter abbreviated to SQ55).

The weight average molecular weight Mw in terms of polystyrene measured by GPC of the obtained compound was 4,900, and the degree of distribution: Mw (weight average molecular weight)/Mn (number average molecular weight) was 1.7.

[Production Example 2] Production of Reactive Silsesquioxane Compound 2 (SQ37)

8.1 g (36 mmol) of STMS, 16.7 g (84 mmol) of PTMS, and 50 g of toluene were placed into a 200-mL reaction flask equipped with a condenser, and an air in the flask was purged with nitrogen using a nitrogen balloon. The reaction mixture was cooled to 0° C., 13.1 g of 0.55% by mass acetic acid aqueous solution (1.2 mmol as acetic acid) was added dropwise, and the mixture was stirred for 2 hours. Subsequently, 0.34 g (6 mmol) of potassium hydroxide was added to this reaction mixture, and the mixture was stirred at 80° C. for 6 hours.

The reaction mixture was cooled to room temperature (about 25° C.), 50 g of toluene was added, and the mixture was washed with 2% by mass sodium sulfate aqueous solution using a separation funnel until the aqueous phase became neutral to basic. The obtained organic phase was evaporated to dryness using a rotary evaporator. The residue was dissolved in 24 g of tetrahydrofuran and the solution was added dropwise to 500 g of n-hexane, resulting in reprecipitation. The precipitated solid was filtered through a membrane filter with a pore size of 0.2 μm, and dried to obtain a reactive silsesquioxane compound 2 (hereinafter abbreviated to SQ37).

The weight average molecular weight Mw in terms of polystyrene measured by GPC of the obtained compound was 5,100, and the degree of distribution: Mw/Mn was 1.8.

[Production Example 3] Production of Reactive Silsesquioxane Compound 3 (SQ73)

18.8 g (84 mmol) of STMS, 7.1 g (36 mmol) of PTMS, and 50 g of toluene were placed into a 200-mL reaction flask equipped with a condenser, and an air in the flask was purged with nitrogen using a nitrogen balloon. The reaction mixture was cooled to 0° C., 13.1 g of 0.55% by mass acetic acid aqueous solution (1.2 mmol as acetic acid) was added dropwise, and the mixture was stirred for 1 hour. Subsequently, 0.34 g (6 mmol) of potassium hydroxide was added to this reaction mixture, and the mixture was stirred at 80° C. for 6 hours.

The reaction mixture was cooled to room temperature (about 25° C.), 50 g of toluene was added, and the mixture was washed with 2% by mass sodium sulfate aqueous solution using a separation funnel until the aqueous phase became neutral to basic. The obtained organic phase was evaporated to dryness using a rotary evaporator. The residue was dissolved in 30 g of tetrahydrofuran and the solution was added dropwise to 500 g of n-hexane, resulting in reprecipitation. The precipitated solid was filtered through a membrane filter with a pore size of 0.2 μm, and dried to obtain a reactive silsesquioxane compound 3 (hereinafter abbreviated to SQ73).

The weight average molecular weight Mw in terms of polystyrene measured by GPC of the obtained compound was 13,300, and the degree of distribution: Mw/Mn was 3.3.

[Production Example 4] Production of Reactive Silsesquioxane Compound 4 (SQ55B)

2.97 g (7.1 mmol) of 35% tetraethylammonium hydroxide, 89.5 g of tetrahydrofuran, and 9.5 g of ion-exchanged water were placed into a 300-mL reaction flask equipped with a condenser, and an air in the flask was purged with nitrogen using a nitrogen balloon. To this mixture, a mixture of 39.6 g (177 mmol) of STMS and 35.0 g (177 mmol) of PTMS was added dropwise at room temperature (about 25° C.) for 10 minutes. The reaction mixture was heated to 40° C. and stirred for 4 hours.

The reaction mixture was cooled to room temperature (about 25° C.), 70.6 g of 1.2% by mass acetic acid/ethyl acetate solution (14 mmol as acetic acid) was added, and when the liquid properties of the aqueous phase became neutral to acidity, the reaction was terminated. This reaction mixture was then added to 448 g of ethyl acetate and 223 g of ion-exchanged water, and an organic phase was isolated using a separation funnel. The obtained organic phase was washed with ion-exchanged water three times, and concentrated using a rotary evaporator to obtain 96.8 g of reactive silsesquioxane compound 4 (hereinafter abbreviated to SQ55B) solution.

From measurement of volatile content at 100° C., the content of SQ55B in the obtained solution was 53.9%. The weight average molecular weight Mw in terms of polystyrene measured by GPC of the obtained compound was 4,000, and the degree of distribution: Mw/Mn was 1.8.

Example 1

27 parts by mass of SQ55 produced in Production Example 1 as a reactive silsesquioxane compound, 63 parts by mass of FDA as a fluorene compound, 10 parts by mass of BnA as another (meth)acrylate compound, and 2 parts by mass of I184 and 0.5 parts by mass of TPO as polymerization initiators were mixed with stirring at 50° C. for 3 hours, and defoamed with stirring for 10 minutes to prepare a polymerizable composition 1.

Examples 2 to 5 and Comparative Examples 1 and 2

Polymerizable compositions 2 to 7 were prepared by the same operation as in Example 1 except that each composition was changed as described in Table 1. Herein, "part(s)" in Table refers to "part(s) by mass."

[Evaluation of Optical Properties]

Each polymerizable composition and a silicone rubber spacer with a thickness of 800 μm were put between two glass substrates that had been subjected to a releasing treatment. This polymerizable composition disposed between two glass substrates was exposed to UV at 20 mW/cm$^2$ for 150 seconds, and heated in an oven of 150° C. for 15 minutes. The polymerizable composition was cooled to room temperature (about 25° C.), and the cured product was released from the glass substrates to produce a specimen having a diameter of 30 mm and a thickness of 800 μm.

The refractive index $n_D$ at D line (wavelength: 589 nm) and the Abbe number $v_D$ of the obtained specimen were measured. The results are shown in Table 1.

[Evaluation of Physical Properties]

Each polymerizable composition was poured into a silicone mold form disposed on a glass substrate that had been subjected to a releasing treatment with a thickness of 200 μm in which a central region was cut into a rectangle of 30 mm×7 mm, and covered with another glass substrate that had been subjected to a releasing treatment. This polymerizable composition in the mold form disposed between the two glass substrates was exposed to UV at 20 mW/cm$^2$ for 150 seconds, and heated in an oven of 150° C. for 15 minutes. The polymerizable composition was cooled to room temperature (about 25° C.), and the cured product was released from the glass substrates to produce a specimen having a length of 30 mm, a width of 7 mm, and a thickness of 200 μm.

A glass transition temperature Tg of the obtained specimen was evaluated. For Tg, the storage elastic modulus E' and the loss elastic modulus E" were measured by DMA. A temperature at which tan δ (loss elastic modulus E"/storage elastic modulus E') obtained from E' and E" was maximum was taken as Tg. When a peak of tan δ was not clearly observed and the maximum of tan δ was very small (0.3 or less), Tg was considered as "None." The results are shown in Table 1. FIG. 1 shows a change in a value of tan δ relative to a measurement temperature in measurement of the specimens of Example 1 and Comparative Example 1.

TABLE 1

| Example/Comparative Example | Polymerizable composition | Silsesquioxane | FDA [Parts] | BnA [Parts] | I184 [Parts] | TPO [Parts] | Refractive index $n_D$ | Abbe number $v_D$ | tanδ maximum | Tg [°C.] |
|---|---|---|---|---|---|---|---|---|---|---|
| Example 1 | Polymerizable composition 1 | SQ55 27 | 63 | 10 | 2 | 0.5 | 1.600 | 28.9 | ≤0.3 | None |
| Example 2 | Polymerizable composition 2 | SQ55 45 | 45 | 10 | 2 | 0.5 | 1.596 | 28.7 | ≤0.3 | None |
| Example 3 | Polymerizable composition 3 | SQ55 59 | 26 | 15 | 2 | 0.5 | 1.591 | 29.6 | ≤0.3 | None |
| Example 4 | Polymerizable composition 4 | SQ37 45 | 45 | 10 | 2 | 0.5 | 1.595 | 31.6 | ≤0.3 | None |
| Example 5 | Polymerizable composition 5 | SQ73 45 | 45 | 10 | 2 | 0.5 | 1.603 | 27.5 | ≤0.3 | None |
| Comparative Example 1 | Polymerizable composition 6 | None | 100 | — | 2 | 0.5 | 1.610 | 28.2 | 0.75 | 112 |
| Comparative Example 2 | Polymerizable composition 7 | SQ55 67 | — | 33 | 2 | 0.5 | The cured product was fragile. Molding was not possible | | | |

As shown in Table 1, a result in which the cured products obtained from the polymerizable compositions of the present invention in Examples 1 to 5 did not have clear Tg in a measurement temperature range (25 to 250° C.) was obtained. For the polymerizable composition of the present invention, very advantageous dimensional stability during heating (solder reflow process at 260° C., etc.) of the cured product was confirmed.

On the other hand, for the cured product (Comparative Example 1) in which a reactive silsesquioxane compound was not added, a clear glass transition point was observed at 112° C., and insufficient dimensional stability during heating was confirmed. For the cured product (Comparative Example 2) in which a fluorene compound was not added, a result in which the cured product was fragile and could not withstand molding was obtained.

Example 6 and Comparative Examples 3 and 4

The polymerizable compositions 1, 6, and 7 produced in Example 1 and Comparative Examples 1 and 2, respectively, were molded on a glass substrate as a support using polydimethylsiloxane mold (25 2-mm lens-shaped molds were disposed at five longitudinal lines×five horizontal rows) by a nanoimprinter. The mold was taken out, and a molded product was heated in an oven of 150° C. for 15 minutes to produce a convex lens on the glass substrate.

The mold releasing properties during detachment of the mold in the aforementioned step were visually evaluated in accordance with the following criteria. The results are shown in Table 2.

The lens height (thickness) of any three convex lenses on the obtained glass substrate was measured before and after a heating test using a reflow oven. From a change ratio (=(lens height before heating−lens height after heating)/lens height before heating×100), heat dimensional stability was evaluated. The presence or absence of cracking in the lens after a heating test was observed by a microscope. In the heating test, the obtained convex lens with the glass substrate was put into a reflow oven for each polymerizable composition, three steps of 1) increasing the temperature to 260° C. in 3 minutes, 2) keeping the temperature at 260° C. for 20 seconds, and 3) cooling the lens to 50° C. were repeated three times. The results are shown in Table 2.

<Evaluation Criteria of Releasing Properties>

A: lens surface is not tacky, and all of the lens remains on the glass substrate.

B: lens surface is not tacky, and a part of the lens remains in the mold.

C: lens surface is tacky, and a part of the lens remains in the mold.

TABLE 2

| Example/Comparative Example | Polymerizable composition | Releasing properties | Crack after heating | Lens height [μm] Before heating | Lens height [μm] After heating | Change ratio [%] |
|---|---|---|---|---|---|---|
| Example 6 | Polymerizable composition 1 | A | None | 570.4 | 570.8 | −0.07 |
| Comparative Example 3 | Polymerizable composition 6 | C | None | 561.8 | 555.9 | 1.05 |
| Comparative Example 4 | Polymerizable composition 7 | The cured product was fragile. Molding was not possible. | | | | |

As shown in Table 2, a result in which even when the reflow process of the cured product (convex lens) obtained from the polymerizable composition of the present invention (Example 6) at 260° C. was repeated three times, a change in lens height was extremely small and the dimensional stability was high was obtained. When the lens was presumed as a lens for camera module, it is desirable that the change ratio of lens height after the reflow process be less than ±1.0%. A result in which after the cured product was molded by a nanoimprinter (cured by UV), a surface of the cured product (convex lens) was not tacky, and the releasing properties from the mold were good was obtained.

On the other hand, for the cured product (Comparative Example 3) in which the reactive silsesquioxane compound was not added, a result in which the change in lens height was as large as 1% or more and the cured product could not withstand the reflow process at 260° C. was obtained. Further, the releasing properties from the mold were significantly inferior. For the cured product (Comparative Example 4) in which a fluorene compound was not added, a result in which the cured product was fragile and could not withstand molding was obtained.

Example 7

A SQ55B solution produced in Production Example 4 as a reactive silsesquioxane compound (27 parts by mass of SQ55B) and 10 parts by mass of BnA as another (meth)acrylate compound were mixed, and a solvent was distilled away using a rotary evaporator. To this residue, 63 parts by mass of FDA as a fluorene compound, 0.5 parts by mass of DDDS as a chain transfer agent (reaction promoter), 0.5 parts by mass of I1010 as an antioxidant, and 2 parts by mass of I184 and 0.5 parts by mass of TPO as polymerization initiators were mixed with stirring at 50° C. for 3 hours, and defoamed with stirring for 10 minutes to prepare a polymerizable composition 8.

Examples 8 to 11

Polymerizable compositions 9 to 12 were prepared by the same operation as in Example 7 except that each composition was changed as described in Table 3.

The optical properties and physical properties of each obtained polymerizable composition were evaluated as described above. The results are shown in Table 4.

TABLE 4

| Example | Polymerizable composition | Refractive index $n_D$ | Abbe number $v_D$ | tan δ maximum | Tg [° C.] |
|---|---|---|---|---|---|
| Example 7 | Polymerizable composition 8 | 1.602 | 28.5 | ≤0.3 | None |
| Example 8 | Polymerizable composition 9 | 1.599 | 28.4 | ≤0.3 | None |
| Example 9 | Polymerizable composition 10 | 1.593 | 28.8 | ≤0.3 | None |
| Example 10 | Polymerizable composition 11 | 1.591 | 28.9 | ≤0.3 | None |
| Example 11 | Polymerizable composition 12 | 1.607 | 27.5 | ≤0.3 | None |

As shown in Table 4, a result in which the cured products obtained from the polymerizable compositions of the present invention in Examples 7 to 11 did not have clear Tg in a measurement temperature range (25 to 250° C.) was obtained. For the polymerizable composition of the present invention, very advantageous dimensional stability during heating (solder reflow process at 260° C., etc.) of the cured product was confirmed.

Examples 12 to 16 and Comparative Example 5

For the polymerizable compositions 8 to 12 and 6 prepared in Examples 7 to 11 and Comparative Example 1, respectively, a convex lens was produced on a glass substrate in the same manner as in Example 6 except that a nickel mold (25 lens molds with a diameter of 2 mm were arranged in 5 rows and 5 columns) that had been subjected to releasing treatment with Novec (registered trademark) 1720 (available from 3M corporation) in advance was used as the mold and the heating time after detachment from the mold was changed to 20 minutes, and evaluated. The results are shown in Table 5.

TABLE 3

| Example/Comparative Example | Polymerizable composition | Silsesquioxane | | FDA [Parts] | BnA [Parts] | Chain transfer agent | [Parts] | I1010 [Parts] | I184 [Parts] | TPO [Parts] |
|---|---|---|---|---|---|---|---|---|---|---|
| Example 7 | Polymerizable composition 8 | SQ55B | 27 | 63 | 10 | DDDS | 0.5 | 0.5 | 2 | 0.5 |
| Example 8 | Polymerizable composition 9 | SQ55B | 36 | 51 | 13 | DDDS | 0.5 | 0.5 | 2 | 0.5 |
| Example 9 | Polymerizable composition 10 | SQ55B | 42.5 | 42.5 | 15 | DDDS | 0.5 | 0.5 | 2 | 0.5 |
| Example 10 | Polymerizable composition 11 | SQ55B | 42.5 | 42.5 | 15 | DDT | 0.5 | 0.5 | 2 | 0.5 |
| Example 11 | Polymerizable composition 12 | SQ55 | 25 | 75 | — | DDT | 0.5 | 0.5 | 2 | 0.5 |

TABLE 5

| Example/Comparative Example | Polymerizable composition | Releasing properties | Crack after heating | Lens height [μm] Before heating | Lens height [μm] After heating | Change ratio [%] |
|---|---|---|---|---|---|---|
| Example 12 | Polymerizable composition 8 | A | None | 464.1 | 462.2 | 0.41 |
| Example 13 | Polymerizable composition 9 | A | None | 462.2 | 460.5 | 0.38 |
| Example 14 | Polymerizable composition 10 | A | None | 470.2 | 468.0 | 0.48 |
| Example 15 | Polymerizable composition 11 | A | None | 481.1 | 477.7 | 0.71 |
| Example 16 | Polymerizable composition 12 | A | None | 482.1 | 478.5 | 0.75 |
| Comparative Example 5 | Polymerizable composition 6 | B | None | Not applicable due to molding failure | | |

As shown in Table 5, results in which even when the cured products (convex lens) obtained from the polymerizable composition of the present invention (Examples 12 to 16) were subjected to a reflow process at 260° C. three times, a change in lens height was sufficiently small even in measurement with high precision and the dimensional stability was high were obtained. As described above, when the lens was presumed as a lens for a camera module, it is desirable that the change ratio of lens height after the reflow process be less than ±1.0%. The present invention was confirmed to be useful in the lens for a camera module and a material thereof. A result in which after the cured product was molded by a nanoimprinter (cured by UV), a surface of the cured product (convex lens) was not tacky, and the releasing properties from the mold were good was obtained.

On the other hand, for the cured product (Comparative Example 5) in which the reactive silsesquioxane compound was not added, a result in which the releasing properties from the nickel mold were poor, and a lens apex was broken and left in the mold was obtained.

Accordingly, the superiority of the polymerizable composition of the present invention containing a reactive silsesquioxane compound was confirmed.

The invention claimed is:

1. A polymerizable composition comprising
a chain transfer agent in an amount of from 0.01 to 20 parts by mass, relative to a total amount of 100 parts by mass of polymerizable components in the polymerizable composition, the polymerizable components including:
(a) 100 parts by mass of reactive silsesquioxane compound obtained by polycondensation of an alkoxy silicon compound A of Formula [1] with an alkoxy silicon compound B of Formula [2] in the presence of an acid or a base, and
(b) 10 to 500 parts by mass of a fluorene compound of Formula [3], where the Formulae [1], [2] and [3] are as follows:

wherein $Ar^1$ is a phenyl group having at least one group having a polymerizable double bond or a naphthyl group having at least one group having a polymerizable double bond, and $R^1$ is a methyl group or an ethyl group;

wherein $Ar^2$ is a phenyl group optionally substituted by a $C_{1-6}$ alkyl group, or a naphthyl group optionally substituted by a $C_{1-6}$ alkyl group, and $R^2$ is a methyl group or an ethyl group; and

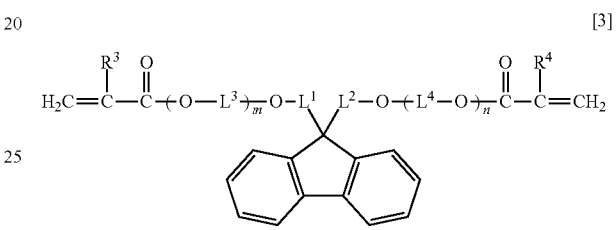

wherein $R^3$ and $R^4$ are each independently a hydrogen atom or a methyl group, $L^1$ and $L^2$ are each independently a phenylene group optionally having a substituent, $L^3$ and $L^4$ are each independently a $C_{1-6}$ alkylene group, and m and n are 0 or a positive integer such that m+n is 0 to 40.

2. The polymerizable composition according to claim 1, further comprising 10 to 100 parts by mass of (c) (meth) acrylate compound that is different from the fluorene compound.

3. The polymerizable composition according to claim 2, wherein the (c) (meth)acrylate compound is a mono(meth) acrylate compound having an aromatic group.

4. The polymerizable composition according to claim 1, wherein the (a) reactive silsesquioxane compound is a reactive silsesquioxane compound obtained by polycondensation of a compound of Formula [1a] with a compound of Formula [2a] in the presence of an acid or a base, where the Formulae [1a] and [2a] are as follows:

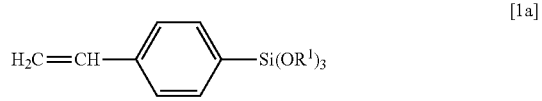

wherein $R^1$ has the same meaning as described above; and

wherein $R^2$ has the same meaning as described above.

5. The polymerizable composition according to claim 1, wherein a cured product obtained from the composition has an Abbe number of 32 or less.

6. A cured product obtained by polymerization of the polymerizable composition according to claim 1.

7. A material for a high-refractive index resin lens that comprises the polymerizable composition according to claim 1.

8. A method for producing a molded body comprising the steps of:
charging a space between a support and a mold with a polymerizable composition;
exposing the charged composition to light resulting in photopolymerization;
releasing a photopolymerized product on the support from the mold; and
heating the photopolymerized product together with the support; wherein the polymerizable composition comprises:
(a) 100 parts by mass of reactive silsesquioxane compound obtained by polycondensation of an alkoxy silicon compound A of Formula [1] with an alkoxy silicon compound B of Formula [2] in the presence of an acid or a base, and (b) 10 to 500 parts by mass of a fluorene compound of Formula [3], where the Formulae [1], [2] and [3] are as follows:

[1]

wherein $Ar^1$ is a phenyl group having at least one group having a polymerizable double bond or a naphthyl group having at least one group having a polymerizable double bond, and $R^1$ is a methyl group or an ethyl group;

[2]

wherein $Ar^2$ is a phenyl group optionally substituted by a $C_{1-6}$ alkyl group, or a naphthyl group optionally substituted by a $C_{1-6}$ alkyl group, and $R^2$ is a methyl group or an ethyl group; and

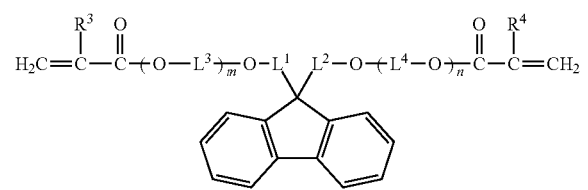
[3]

wherein $R^3$ and $R^4$ are each independently a hydrogen atom or a methyl group, $L^1$ and $L^2$ are each independently a phenylene group optionally having a substituent, $L^3$ and $L^4$ are each independently a $C_{1-6}$ alkylene group, and m and n are 0 or a positive integer such that m+n is 0 to 40.

9. The method according to claim 8, wherein the molded body is a lens for a camera module.

10. A polymerizable composition comprising
(a) 100 parts by mass of reactive silsesquioxane compound, the 100 parts by mass of reactive silsesquioxane compound obtained by a reaction consisting of a polycondensation of an alkoxy silicon compound A of Formula [1] with an alkoxy silicon compound B of Formula [2] in the presence of an acid or a base, and optionally a solvent, and
(b) 10 to 500 parts by mass of a fluorene compound of Formula [3], where the Formulae [1], [2] and [3] are as follows:

[1]

wherein $Ar^1$ is a phenyl group having at least one group having a polymerizable double bond or a naphthyl group having at least one group having a polymerizable double bond, and $R^1$ is a methyl group or an ethyl group;

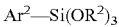
[2]

wherein $Ar^2$ is a phenyl group optionally substituted by a $C_{1-6}$ alkyl group, or a naphthyl group optionally substituted by a $C_{1-6}$ alkyl group, and $R^2$ is a methyl group or an ethyl group; and

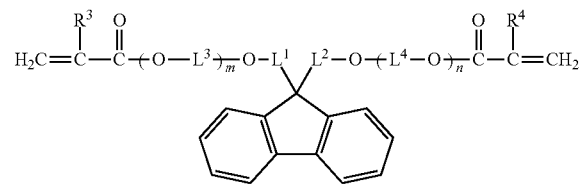
[3]

wherein $R^3$ and $R^4$ are each independently a hydrogen atom or a methyl group, $L^1$ and $L^2$ are each independently a phenylene group optionally having a substituent, $L^3$ and $L^4$ are each independently a $C_{1-6}$ alkylene group, and m and n are 0 or a positive integer such that m+n is 0 to 40.

11. The polymerizable composition according to claim 10, further comprising 10 to 100 parts by mass of (c) (meth)acrylate compound that is different from the fluorene compound.

12. The polymerizable composition according to claim 11, wherein the (c) (meth)acrylate compound is a mono(meth)acrylate compound having an aromatic group.

13. The polymerizable composition according to claim 10, wherein the (a) reactive silsesquioxane compound is a reactive silsesquioxane compound obtained by polycondensation of a compound of Formula [1a] with a compound of Formula [2a] in the presence of an acid or a base, where the Formulae [1a] and [2a] are as follows:

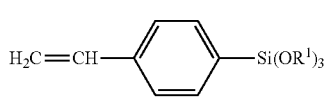
[1a]

wherein $R^1$ has the same meaning as described above; and

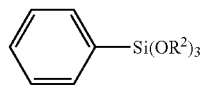
[2a]

wherein $R^2$ has the same meaning as described above.

14. The polymerizable composition according to claim 10, wherein a cured product obtained from the composition has an Abbe number of 32 or less.

15. A cured product obtained by polymerization of the polymerizable composition according to claim 10.

16. A material for a high-refractive index resin lens that comprises the polymerizable composition according to claim 10.

* * * * *